(12) United States Patent
Yin et al.

(10) Patent No.: US 9,094,857 B2
(45) Date of Patent: *Jul. 28, 2015

(54) METHOD, APPARATUS AND SYSTEM FOR HANDLING NODE FAILURE

(75) Inventors: Yu Yin, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

This patent is subject to a terminal disclaimer.

(21) Appl. No.: 13/560,489

(22) Filed: Jul. 27, 2012

(65) Prior Publication Data

US 2012/0294155 A1 Nov. 22, 2012

Related U.S. Application Data

(63) Continuation of application No. PCT/CN2010/070383, filed on Jan. 27, 2010.

(51) Int. Cl.
*H04L 12/26* (2006.01)
*H04L 29/14* (2006.01)
*H04W 24/04* (2009.01)
*H04L 12/703* (2013.01)
*H04W 92/24* (2009.01)

(52) U.S. Cl.
CPC ............... *H04W 24/04* (2013.01); *H04L 45/28* (2013.01); *H04W 92/24* (2013.01)

(58) Field of Classification Search
None
See application file for complete search history.

(56) References Cited

U.S. PATENT DOCUMENTS

2005/0018599 A1 1/2005 Mahasoom et al.
2011/0176407 A1* 7/2011 Campbell ..................... 370/216

FOREIGN PATENT DOCUMENTS

| CN | 101547168 A | 9/2009 | |
|----|-------------|--------|---|
| CN | 101572863 A | 11/2009 | |
| KR | 20080068989 A | 7/2008 | |
| WO | WO 2005008975 A1 | 1/2005 | |
| WO | WO 2009/117886 A1 | 10/2009 | |
| WO | WO 2009117886 A1 * | 10/2009 | ............ H04W 76/00 |

OTHER PUBLICATIONS

Farooq Bari, SAE and Evolved Packet Core, Nov. 13, 2008, Seattle Communications (COM-19) Society Chapter, pp. 1-43.*
Office Action issued in commonly owned U.S. Appl. No. 13/666,225, mailed Aug. 6, 2013, 19 pages.
Extended European Search Report issued in corresponding European Patent Application No. 10844368.0, mailed Dec. 14, 2012.

(Continued)

*Primary Examiner* — Omar Ghowrwal
(74) *Attorney, Agent, or Firm* — Brinks Gilson & Lione

(57) ABSTRACT

Embodiments of the present invention provide a method, an apparatus and a system for handling node failure. The method for handling node failure includes: sending, by an intermediate node, a context processing request message to a remote node when detecting that a first node occurs a failure, where the context processing request message is used to instruct the remote node to delete context information associated with the first node and the intermediate node; and deleting the context information associated with the first node and the intermediate node, by the remote node, according to the request message. The technical solution can enable the remote node to process the context information associated with the first node in time.

12 Claims, 8 Drawing Sheets

(56) References Cited

OTHER PUBLICATIONS

LTE, "3rd Generation Partnership Project; Technical Specification Group Core Network; Restoration Procedures" (Release 9) 3GPP TS 23.007. V9.2.0, Dec. 2009.
Written Opinion of the International Searching Authority issued in corresponding PCT Patent Application No. PCT/CN2010/070383, mailed Nov. 4, 2010.
International Search Report issued in corresponding PCT Patent Application No. PCT/CN2010/070383, mailed Nov. 4, 2010.
Office Action issued in corresponding Chinese Patent Application No. 201080001638.7, mailed Jul. 2, 2013, 11 pages.
Search Report issued in corresponding Chinese Patent Application No. 201080001638.7, mailed Jul. 2, 2013, 2 pages.
Office Action issued in commonly owned U.S. Appl. No. 13/666,335, mailed Mar. 15, 2013.

* cited by examiner

METHOD, APPARATUS AND SYSTEM FOR HANDLING NODE FAILURE

CROSS-REFERENCE TO RELATED APPLICATIONS

This application is a continuation of International Application No. PCT/CN2010/070383, filed on Jan. 27, 2010, which is hereby incorporated by reference in its entirety.

FIELD OF THE INVENTION

The present invention relates to the field of network communications technologies, and in particular, a technology for handling node failure.

BACKGROUND OF THE INVENTION

In a network such as a General Packet Radio Service (General Packet Radio Service, GPRS) network, an Internet Protocol (Internet Protocol, IP) network or an Evolved Packet Core (Evolved Packet Core, EPC) network, in the case that a first node and a second node are neighboring nodes, if the second node detects that the first node occurs a failure, the second node needs to process context information associated with the first node, for example, the second node deletes the context information associated with the first node or sets the context information associated with the first node be invalid. The case that the second node detects that the first node occurs a failure may be that the second node detects that the first node is reset, or the second node detects the path to the first node is faulty, or the second node detects that the first node is unreachable.

During the implementation of the present invention, the inventors find that, in the case that the first node and the second node are not neighboring nodes, if the first node occurs a failure, the second node cannot perceive the failure of the first node, so that the second node does not process the context information associated with the first node. The context information in the second node wastes network resources, and also may cause a potential risk of exception to the network.

SUMMARY OF THE INVENTION

Embodiments of the present invention provide a method, an apparatus and a system for handling node failure, which can enable a remote node to process context information associated with a first node and an intermediate node in time, so as to save network resources, and eliminate the potential risk to the network caused by the context information in the remote node.

A method for handling node failure provided in an embodiment of the present invention includes:

detecting, by an intermediate node, that a first node occurs a failure, where the failure of the first node includes the following: the first node is reset, a path between the intermediate node and the first node is faulty, or the first node is unreachable; and sending, by the intermediate node, a context processing request message carrying an identifier of the first node and an identifier of the intermediate node to a remote node, where the context processing request message is used to instruct the remote node to delete context information associated with the first node and the intermediate node or set the context information associated with the first node and the intermediate node be invalid.

Another method for handling node failure provided in an embodiment of the present invention includes:

receiving, by a remote node, a context processing request message sent by an intermediate node and carrying an identifier of a first node and an identifier of an intermediate node, where the context processing request message is a message sent by the intermediate node when the intermediate node detects that a first node occurs a failure, where the failure of the first node includes the following: the first node is reset, a path between the intermediate node and the first node is faulty, or the first node is unreachable; and deleting context information associated with the first node and the intermediate node or setting the context information associated with the first node and the intermediate node be invalid, by the remote node, according to the identifier of the first node and the identifier of the intermediate node carried in the message.

An apparatus for handling node failure provided in an embodiment of the present invention includes:

a detection module, configured to detect that a first node occurs a failure, where the failure of the first node includes the following: the first node is reset, a path between the intermediate node and the first node is faulty, or the first node is unreachable; and a first processing module, configured to send a context processing request message carrying an identifier of the first node and an identifier of the intermediate node to a remote node, where the context processing request message is used to instruct the remote node to delete context information associated with the first node and the intermediate node or set the context information associated with the first node and the intermediate node be invalid.

Another apparatus for handling node failure provided in an embodiment of the present invention includes:

a receiving module, configured to receive a context processing request message sent by an intermediate node and carrying an identifier of a first node and an identifier of the intermediate node, where the context processing request message is a message sent by the intermediate node when the intermediate node detects that the first node occurs a failure, where the failure of the first node includes the following: the first node is reset, a path between the intermediate node and the first node is faulty, or the first node is unreachable; and a second processing module, configured to delete context information associated with the first node and the intermediate node or set the context information associated with the first node and the intermediate node be invalid, according to the identifier of the first node and the identifier of the intermediate node carried in the message.

A system for handling node failure provided in an embodiment of the present invention includes:

a first node, connected to a remote node through an intermediate node;

the intermediate node, configured to detect that the first node occurs a failure, and send a context processing request message carrying an identifier of the first node and an identifier of the intermediate node to the remote node, where the failure of the first node includes the following: the first node is reset, a path between the intermediate node and the first node is faulty, or the first node is unreachable; and the remote node, configured to receive the context processing request message, and delete context information associated with the first node and the intermediate node or set the context information associated with the first node and the intermediate node be invalid, according to the identifier of the first node and the identifier of the intermediate node carried in the message.

It can be known from the above technical solutions that, when detecting that a first node occurs a failure, an intermediate node sends a context processing request message to a remote node, so that the remote node can obtain that the first node occurs a failure in time, and accordingly the remote node can delete context information associated with the first node and the intermediate node or set the context information associated with the first node and the intermediate node be invalid in time according to an identifier of the first node and an identifier of the intermediate node carried in the message, so as to save network resources, and eliminate the potential risk to the network caused by the context information in the remote node, thereby improving the stability of the network.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions show merely some of the embodiments of the present invention, and persons skilled in the art can obtain other drawings according to the accompanying drawings without creative efforts.

DETAILED DESCRIPTION OF THE EMBODIMENTS

Figure 1:
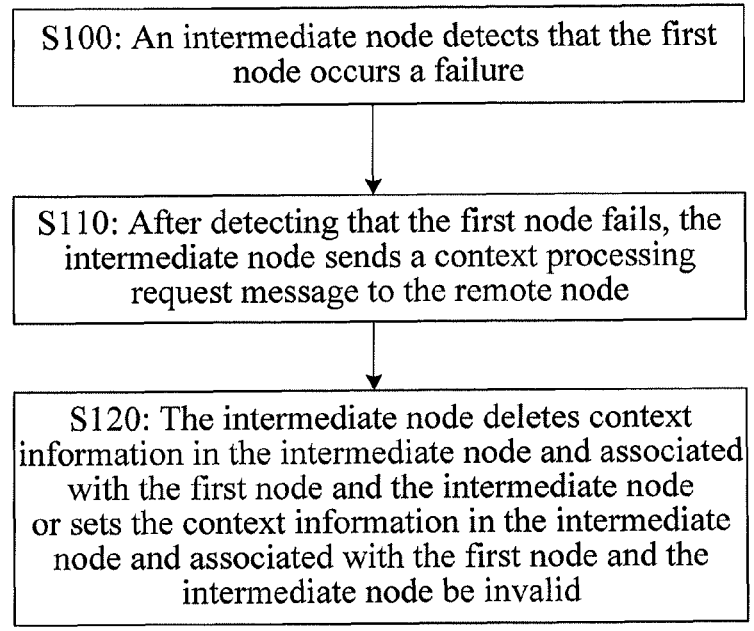
FIG. 1 is a flowchart of a method for handling node failure according to Embodiment 1 of the present invention.

The specific implementation processes of the method, apparatus and system for handling node failure of the present invention are described below with examples. It is obvious that the embodiments to be described below are only a part rather than all of the embodiments of the present invention. All other embodiments obtained by persons skilled in the art based on the embodiments of the present invention without creative efforts shall fall within the protection scope of the present invention.

Embodiment 1

Method for handling node failure. In this embodiment, a first node and a remote node are connected through an intermediate node. The first node, the remote node and the intermediate node may be network elements in a next generation mobile communication network (for example, evolved packet exchange Evolved Packet System network, that is, EPS network), or network elements in an Internet Protocol (Internet Protocol, IP) network.

Specifically, the intermediate node may include a Serving Gateway (serving gateway, SGW), a Mobile Access Gateway (mobile access gateway, MAG) or a Foreign Agent (foreign agent, FA). In the case that the first node includes a Mobility Management Entity (mobility management entity, MME), a Serving General Packet Radio Service Support Node (GPRS service support node, SGSN), an Access Gateway (access gateway, A-GW) or an evolved Packet Data Gateway (evolved packet data gateway, ePDG), the remote node may include a Packet Data Network Gateway (packet data network gateway, PGW), a Local Mobility Anchor (local mobility anchor, LMA) or a Home Agent (home agent, HA); in the case that the first node includes a packet data network gateway, a local mobility anchor or an HA, the remote node may include a mobility management entity, a GPRS service support node, an A-GW or an evolved packet data gateway. Specific network application scenarios are listed as follows:

Network application scenario 1: The first node is an MME, the intermediate node is an SGW, and the remote node is a PG.

Network application scenario 2: The first node is an MME, the intermediate node is an MAG, and the remote node is an LMA.

Network application scenario 3: The first node is an SGSN, the intermediate node is an SGW, and the remote node is a PGW.

Network application scenario 4: The first node is an A-GW or ePDG, the intermediate node is an MAG, and the remote node is an LMA.

Network application scenario 5: The first node is an A-GW or ePDG, the intermediate node is an SGW, and the remote node is a PGW.

Network application scenario 6: The first node is an A-GW or ePDG, the intermediate node is an FA, and the remote node is an HA.

In the six network application scenarios listed above, the first node and the remote node are interchangeable in each application scenario. In the following embodiments, the specific network application scenarios are not repeatedly described.

The process of the method of Embodiment 1 is shown in FIG. 1.

In FIG. 1, S100: The intermediate node detects that the first node occurs a failure. Here, the failure of the first node indicates that the access to the first node is abnormal, and the failure of the first node may be caused by the case that the first node is abnormal or the connection between the intermediate node and the first node is abnormal. Here, the failure of the first node may include the following: the first node is reset, a path between the intermediate node and the first node is faulty, or the first node is unreachable. In an actual network, the failure of the first node may also include other cases except the above three cases, and this embodiment does not limit the specific case of the failure of the first node.

The intermediate node may detect that the first node occurs a failure by using existing ways, the way of detecting that the first node occurs a failure varies with different networks, and this embodiment does not limit the specific implementation process of detecting that the first node occurs a failure.

S110: When detecting that the first node occurs a failure, the intermediate node sends a context processing request message to the remote node. The context processing request message is used to instruct the remote node to process context information associated with the first node and the intermediate node, for example, delete the context information associated with the first node and the intermediate node in the remote node or set the context information associated with the first node and the intermediate node in the remote node be invalid. Here, the invalidation operation is, for example, setting an invalid tag in the context information.

The context processing request message sent by the intermediate node to the remote node carries deletion/invalidation location information, and the deletion/invalidation location information is used by the remote node to delete context information corresponding to the deletion/invalidation location information or set the context information corresponding to the deletion/invalidation location information be invalid. For example, the remote node determines context information to be deleted or set be invalid from the context information stored by the remote node according to the deletion/invalidation location information carried in the context processing request message.

The deletion/invalidation location information may include an identifier of the first node and an identifier of the intermediate node. That is, the intermediate node carries the identifier of the first node and the identifier of the intermediate node in the context processing request message, and sends the context processing request message to the remote node, and after receiving the context processing request message, the remote node deletes context information corresponding to the identifier of the first node and the identifier of the intermediate node or sets the context information corresponding to the identifier of the first node and the identifier of the intermediate node be invalid, for example, the remote node searches stored context information for context information matching the identifier of the first node and the identifier of the intermediate node carried in the message, and deletes the found matching context information or sets the found matching context information be invalid; for another example, the remote node directly indexes corresponding context information through the identifier of the first node and the identifier of the intermediate node, and the remote node deletes the found context information or sets the found context information be invalid. Here, the identifier of the first node and the identifier of the intermediate node may be IP address identifiers, or non IP address identifiers.

The deletion/invalidation location information may also include an identifier of the first node, an identifier of the intermediate node, a PDN Connection Set Identifier (packet data network connection set identifier, CSID) mask of the first node and a first match word. That is, the intermediate node obtains the first match word according to the stored CSID mask of the first node and a CSID that is assigned by the first node (that is, a CSID of the first node) in the context information associated with the first node, for example, the intermediate node may obtain the first match word by performing the AND operation of the CSID mask of the first node and the CSID that is assigned by the first node, and then the intermediate node carries the identifier of the first node, the identifier of the intermediate node, the CSID mask of the first node and the first match word in a context processing request message, and sends the context processing request message to the remote node. After receiving the context processing request message, the remote node obtains a second match word, by using a CSID of the first node in context information corresponding to the identifier of the first node and the identifier of the intermediate node carried in the message and the CSID mask of the first node carried in the message, for example, the remote node obtains the second match word by performing the AND operation of the CSID mask of the first node carried in the message and the CSID assigned by the first node in the context information stored by the remote node and associated with the first node and the intermediate node, and the remote node deletes the context information with the first match word and the second match word being the same or sets the context information with the first match word and the second match word being the same be invalid. It should be noted that, the way for the intermediate node to obtain the first match word should be the same as the way for the remote node to obtain the second match word. In addition, the CSID mask of the first node stored by the intermediate node may be a CSID mask of the first node obtained by the intermediate node from a message sent by the first node in a process of initial communication with the first node.

A specific example of S110 is that, after detecting reset of the first node, the intermediate node sends a context processing request message carrying an identifier of the intermediate node and an identifier of the first node to the remote node, so as to instruct the remote node to delete context information corresponding to the identifier of the first node and the identifier of the intermediate node in the context processing request message or set the context information corresponding to the identifier of the first node and the identifier of the intermediate node in the context processing request message be invalid. Here, the identifier of the intermediate node and the identifier of the first node may both be IP address identifiers, or non IP address identifiers. The context information corresponding to the identifier of the first node and the identifier of the intermediate node is context information associated with the first node and the intermediate node.

Another specific example of S110 is that, after detecting that the path of a connection to the first node is faulty or the first node is unreachable, the intermediate node sends a context processing request message to the remote node, where the message carries an identifier of the intermediate node and an IP address of the first node, so as to instruct the remote node to delete context information corresponding to the IP address of the first node and the identifier of the intermediate node in the message or set the context information corresponding to the IP address of the first node and the identifier of the intermediate node in the message be invalid. Here, the identifier of the intermediate node may be an IP address identifier, or a non IP address identifier.

A third specific example of S110 is that, after detecting that the path of a connection to the first node is faulty or the first node is unreachable, the intermediate node sends a context processing request message to the remote node, where the message carries an identifier of the intermediate node, an identifier of the first node, a CSID mask of the first node and the first match word, so as to instruct the remote node to delete context information corresponding to the identifier of the intermediate node, the identifier of the first node, the CSID mask of the first node and the first match word in the message or set the context information corresponding to the identifier of the intermediate node, the identifier of the first node, the CSID mask of the first node and the first match word in the message be invalid. Here, the identifier of the intermediate node may be an IP address of the intermediate node, or a non IP address identifier, and the identifier of the first node may be a non IP address identifier.

In this embodiment, the context information in the remote node may be embodied in different specific forms according to different specific network device forms of the remote node, for example, the context information in the remote node may include Packet Data Network Connection Context (packet data network connection context information, PDN connection context information), User Equipment Context (user equipment context information, UE context information), Packet Data Packet Context (packet data packet context information, PDP context information), Binding Cache Entry (binding cache entry, BCE) or Binding Update List Entry (binding update list entry, BULE), and this embodiment does not limit the specific content included by the context information in the remote node.

S120: The intermediate node deletes the context information associated with the first node or sets the context information associated with the first node be invalid.

The intermediate node may delete the context information associated with the first node immediately after sending the context processing request message, or delete the context information associated with the first node after sending the context processing request message and receiving a response packet (that is, context processing response message) returned by the remote node in response to the request message. The response packet may be a response packet indicating successful deletion or invalidation, or a response packet indicating failed deletion or invalidation.

In this embodiment, the context information in the intermediate node may be embodied in different specific forms according to different specific network device forms of the intermediate node, for example, the context information in the intermediate node may include PDN connection context information, UE context information, PDP context information, binding cache entry or binding update list entry, and this embodiment does not limit the specific content included by the context information in the intermediate node.

In Embodiment 1, when detecting that the first node occurs a failure, the intermediate node sends the context processing request message to the remote node, so that the remote node may delete the context information associated with the first node and the intermediate node or set the context information associated with the first node and the intermediate node be invalid, so as to prevent the case that, if the first node occurs a failure, the remote node still uses the stored context information associated with the first node and the intermediate node as valid context information, and further prevent the case that the remote node maintains a large amount of context information associated with the first node and the intermediate node, thereby eliminating the potential risk to the network caused by inconsistency of context information in the remote node, the intermediate node, and the first node, and improving the stability of the network.

Embodiment 2

Method for handling node failure. In this embodiment, a first node and a remote node are connected through an intermediate node. The first node, the remote node and the intermediate node may be network elements in a next generation mobile communication network, or network elements in an IP network. Specifically, the intermediate node may include a serving gateway, a mobile access gateway or an FA. In the case that the first node includes a mobility management entity, a GPRS service support node, an A-GW or an evolved packet data gateway, the remote node may include a packet data network gateway, a local mobility anchor or an HA; in the case that the first node includes a packet data network gateway, a local mobility anchor or an HA, the remote node may include a mobility management entity, a GPRS service support node, an A-GW or an evolved packet data gateway.

Figure 2:
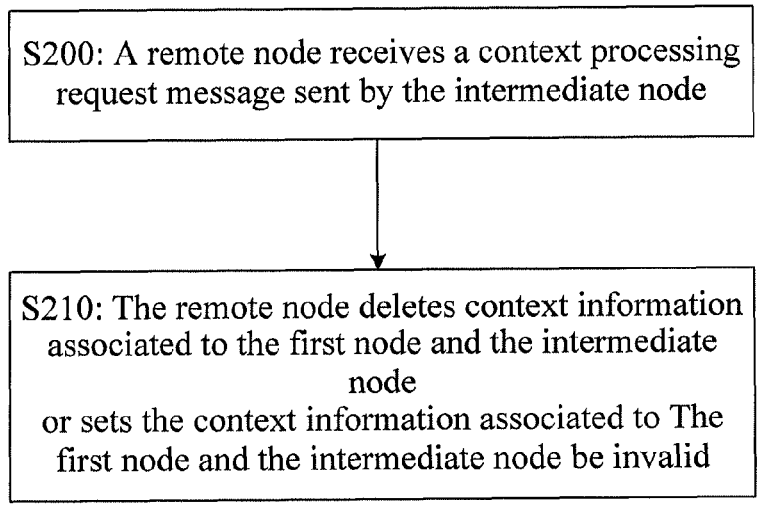
FIG. 2 is a flowchart of a method for handling node failure according to Embodiment 2 of the present invention.

The process of the method of Embodiment 2 is shown in FIG. 2.

In FIG. 2, S200: The remote node receives a context processing request message sent by the intermediate node. The context processing request message is a message sent by the intermediate node when the intermediate node detects that the first node occurs a failure. Here, the failure of the first node includes the following: the first node is reset, a path between the intermediate node and the first node is faulty, or the first node is unreachable.

S210: The remote node deletes context information associated with the first node and the intermediate node or sets the context information associated with the first node and the intermediate node be invalid.

The context processing request message received by the remote node carries deletion/invalidation location information. The remote node may delete context information or set the context information be invalid according to the deletion/invalidation location information carried in the message, that is, the remote node deletes context information corresponding to the deletion/invalidation location information carried in the message or sets context information corresponding to the deletion/invalidation location information carried in the message be invalid.

The deletion/invalidation location information may include an identifier of the first node and an identifier of the intermediate node, or may include an identifier of the first node, an identifier of the intermediate node, a CSID mask of the first node and a first match word.

In the case that the deletion/invalidation location information includes an identifier of the first node and an identifier of the intermediate node, the remote node may delete context information corresponding to the identifier of the first node and the identifier of the intermediate node or set the context information corresponding to the identifier of the first node and the identifier of the intermediate node be invalid. For example, the remote node may search stored context information for the context information corresponding to the identifier of the first node and the identifier of the intermediate node carried in the context processing request message, and delete the found context information or set the found context information be invalid; for another example, the remote node may directly index corresponding context information through the identifier of the first node and the identifier of the intermediate node, and delete the found context information or set the found context information be invalid.

In the case that the deletion/invalidation location information includes an identifier of the first node, an identifier of the intermediate node, a CSID mask of the first node and the first match word, the remote node may obtain a second match word by using a CSID of the first node in context information corresponding to the identifier of the first node and the identifier of the intermediate node carried in the context processing request message and the CSID mask of the first node carried in the context processing request message. For example, the remote node obtains the second match word by performing the AND operation of the CSID mask of the first node and the CSID of the first node, and the remote node deletes the context information with the first match word and the second match word being the same or sets the context information with the first match word and the second match word being the same be invalid. If the first match word and the second match word are not the same, the context information is not deleted or set be invalid. It should be noted that, if the remote node stores a plurality of pieces of context information corresponding to the identifier of the first node and the identifier of the intermediate node, the remote node should perform, for each piece of context information, the above process of obtaining the second match word and deleting the context information with the match words being the same or setting the context information with the match words being the same be valid.

Optionally, after the remote node deletes the context information associated with the first node and the intermediate node or sets the context information associated with the first node and the intermediate node be invalid, the remote node may further return a response packet (that is, context processing response message) to the intermediate node, where the response packet is used to notify the intermediate node whether the remote node successfully deletes the context information associated with the first node and the intermediate node or sets the context information associated with the first node and the intermediate node be invalid.

In Embodiment 2, after the remote node receives the context processing request message sent by the intermediate node when detecting that the first node occurs a failure, the remote node may delete the context information associated with the first node and the intermediate node or set the context information associated with the first node and the intermediate node be invalid, so as to prevent the case that, if the first node occurs a failure, the remote node still uses the stored context information associated with the first node and the intermediate node as valid context information, and further prevent the case that the remote node maintains a large amount of context information associated with the first node and the intermediate node, thereby eliminating the potential risk to the network caused by inconsistency of context information in the remote node, the first node, and intermediate node, and improving the stability of the network.

Embodiment 3

Method for handling node failure. The process of the method is shown in FIG. 3.

Figure 3:
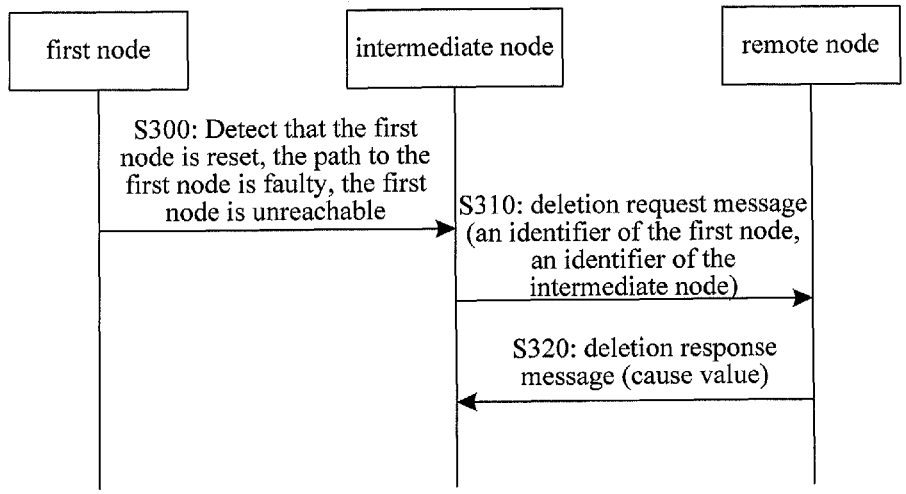
FIG. 3 is a flowchart of a method for handling node failure according to Embodiment 3 of the present invention.

In FIG. 3, the intermediate node may be an SGW, an MAG or an FA. The first node may be an MME, an SGSN, an A-GW, a PGW, an LMA, an ePDG or an HA. If the first node is an MME, an SGSN, an A-GW or an ePDG, the remote node may be a PGW, an LMA or an HA, and if the first node is a PGW, an LMA or an HA, the remote node may be an MME, an SGSN, an A-GW or an ePDG.

S300: The intermediate node detects that the first node is reset, a path between the intermediate node and the first node is faulty, or the first node is unreachable.

In the case that the interface protocol between the first node and the intermediate node is a GPRS Tunneling Protocol (GPRS tunneling protocol, GTP), a specific example that the intermediate node detects reset of the first node is as follows: The intermediate node receives a GTP message sent by the first node, and if a count value of a restart counter carried in the GTP message is different from a count value of a restart counter of the first node in the intermediate node, for example, the count value of the restart counter carried in the GTP message is larger than the count value of the restart counter of the first node in the intermediate node, the intermediate node detects that the first node is reset; otherwise, the intermediate node detects that the first node is not reset. Here, the GTP message may be a path management message or a tunnel management message. This embodiment does not limit the specific form of the GTP message.

In the case that the interface protocol between the first node and the intermediate node is a Proxy Mobile IP (proxy mobile IP, PMIP), a specific example that the intermediate node detects reset of the first node is as follows: The intermediate node receives a heartbeat response message sent by the first node, and if a count value of a restart counter carried in the heartbeat response message is different from a count value of a restart counter of the first node in the intermediate node (for example, the count value of the restart counter carried in the heartbeat response message is larger than the count value of the restart counter of the first node in the intermediate node), the intermediate node detects that the first node is reset; otherwise, the intermediate node detects that the first node is not reset.

In the case that the interface protocol between the first node and the intermediate node is the GTP, a specific example that the intermediate node detects that a path between the intermediate node and the first node occurs a failure is as follows: The intermediate node sends an echo request message to the first node, and if the intermediate node does not receive an echo response message returned by the first node within the last message retransmission time, the intermediate node detects that a path between the intermediate node and the first node occurs a failure; otherwise, the first node determines that the path between the intermediate node and the first node is normal.

In the case that the interface protocol between the first node and the intermediate node is the PMIP, a specific example that the intermediate node detects that the first node is unreachable is as follows: The intermediate node sends a heartbeat request message to the first node, and if the number of heartbeat response messages which are returned by the first node and not received by the intermediate node exceeds a preconfigured maximum allowable number of missing heartbeat messages, the intermediate node detects that the first node is unreachable; otherwise, the intermediate node detects that the first node is reachable.

S310: The intermediate node sends a deletion request message to the remote node, where the deletion request message is a context processing request message, and this embodiment does not limit the specific form of the context processing request message.

A first specific example of S310 is that, in the case that the intermediate node detects that the first node is reset and restarted, the intermediate node carries an identifier of the first node (for example, IP address of the first node, or non-IP address identifier of the first node) and an identifier of the intermediate node (for example, IP address of the intermediate node, or non-IP address identifier of the intermediate node) in the deletion request message, and sends the deletion request message to the remote node.

A second specific example of S310 is that, in the case that the intermediate node detects that a path between the intermediate node and the first node is faulty or detects that the first node is unreachable, and context information in the remote node includes a first node IP address, the intermediate node carries the first node IP address and an identifier of the intermediate node (for example, IP address of the intermediate node, or non-IP address identifier of the intermediate node) in the deletion request message, and sends the deletion request message to the remote node.

A third specific example of S310 is that, in the case that the intermediate node detects that a path between the intermediate node and the first node is faulty or detects that the first node is unreachable, and an identifier of the first node included in context information in the remote node is a non IP address identifier of the first node, the intermediate node obtains a first match word through a CSID mask of the first node and a CSID of the first node that is in context information associated with the first node in the intermediate node, for example, the intermediate node obtains the first match word by performing the AND operation of the CSID mask of the first node and the CSID of the first node, and the intermediate node carries the non IP address identifier of the first node, an identifier of the intermediate node (for example, IP address of the intermediate node, or non-IP address identifier of the intermediate node), the CSID mask of the first node, and the first match word in the deletion request message, and sends the deletion request message to the remote node.

In the case that the interface protocol between the intermediate node and the remote node is the GTP, the deletion request message in S310 may specifically include a Delete Bearer Request (delete bearer request) message, a Delete PDN Connection Set Request (delete PDN connection set request) message or a Delete Session Request (delete session request) message. In the case that the interface protocol between the intermediate node and the remote node is the PMIP, the deletion request message in S310 may include a Binding Revocation Indication (binding revocation indication, BRI) message. This embodiment does not limit the specific form of the deletion request message.

S320: After receiving the deletion request message, the remote node processes context information according to the deletion request message, and returns a deletion response message to the intermediate node. The deletion response message carries a cause value indicating successful deletion or failed deletion.

Specifically, for the first specific example in S310, in S320, the remote node deletes PDN connection context information, PDP context information, UE context information, Binding Cache Entry (binding cache entry, BCE) or Binding Update List Entry (binding update list entry, BULE) corresponding to an identifier of the first node and an identifier of the intermediate node, for example, the remote node searches stored PDN connection context information, PDP context information, UE context information, BCE or BULE for PDN connection context information, PDP context information, UE context information, BCE or BULE corresponding to the identifier of the first node and the identifier of the intermediate node in the message, that is, the remote node searches the stored PDN connection context information, UE context information, PDP context information, BCE or BULE for PDN connection context information, PDP context information, UE context information, BCE or BULE that includes the identifier of the first node and the identifier of the intermediate node in the message, and the remote node deletes the found PDN connection context information, PDP context information, UE context information, BCE or BULE; for another example, the remote node directly indexes corresponding PDN connection context information, PDP context information, UE context information, BCE or BULE through the identifier of the first node and the identifier of the second node, and deletes the found PDN connection context information, PDP context information, UE context information, BCE or BULE.

For the second specific example in S310, in S320, the remote node deletes UE context information, PDP context information, PDN connection context information, BCE or BULE corresponding to the first node IP address and an identifier of the intermediate node, for example, the remote node searches UE context information, PDP context information, PDN connection context information, BCE or BULE for UE context information, PDP context information, PDN connection context information, BCE or BULE corresponding to the first node IP address and the identifier of the intermediate node in the message, for example, searches the UE context information, PDP context information, PDN connection context information, BCE or BULE for UE context information, PDP context information, PDN connection context information, BCE or BULE that includes the first node IP address and the identifier of the intermediate node in the message, and the remote node deletes the found UE context information, PDP context information, PDN connection context information, BCE or BULE.

For the third specific example in S310, in S320, the remote node obtains the second match word through a CSID of the first node included in PDN connection context information, PDP context information, UE context information, BCE or BULE corresponding to the identifier of the first node and the identifier of the intermediate node in the message and the CSID mask of the first node carried in the message, for example, the remote node obtains the second match word by performing the AND operation of the CSID mask of the first node and the CSID of the first node, and the remote node deletes the PDN connection context information, PDP context information, UE context information, BCE or BULE with the first match word and the second match word being the same. It should be noted that, the method for the remote node to use the CSID of the first node and the CSID mask of the first node to obtain the second match word should be the same as the method for the intermediate node to obtain the first match word, the above AND operation is an example only, and the first match word and the second match word may also be obtained in other ways.

In the case that the interface protocol between the intermediate node and the remote node is the GTP, corresponding to the deletion request message in S310, the deletion response message in S320 may specifically include a Delete Bearer Response (delete bearer response) message, a Delete PDN Connection Set Response (delete PDN connection set response) message or a Delete Session Response (delete session response) message. In the case that the interface protocol between the intermediate node and the remote node is the PMIP, corresponding to the deletion request message in S310, the deletion response message in S320 may specifically include a Binding Revocation Acknowledgement (binding revocation acknowledgement, BRI) message. This embodiment does not limit the specific form of the deletion response message.

In addition, Embodiment 3 is described with an example of deleting PDN connection context information, PDP context information, UE context information, BCE or BULE, and if it needs to set PDN connection context information, PDP context information, UE context information, BULE or BCE be invalid, rather than delete PDN connection context information, PDP context information, UE context information, BULE or BCE, it only needs to replace the deletion operation in this embodiment with an invalidation operation. The invalidation operation is, for example, setting an invalid identifier for the PDN connection context information, PDP context information, UE context information, BULE or BCE.

Embodiment 4

Method for handling reset of an access node. In this embodiment, an access node (that is, a first node) may include an MME, an SGSN, an A-GW or an ePDG, a serving gateway (that is, an intermediate node) may include an SGW, an MAG or an FA, and a data gateway (that is, a remote node) may include a PGW, an LMA or an HA.

Figure 4:
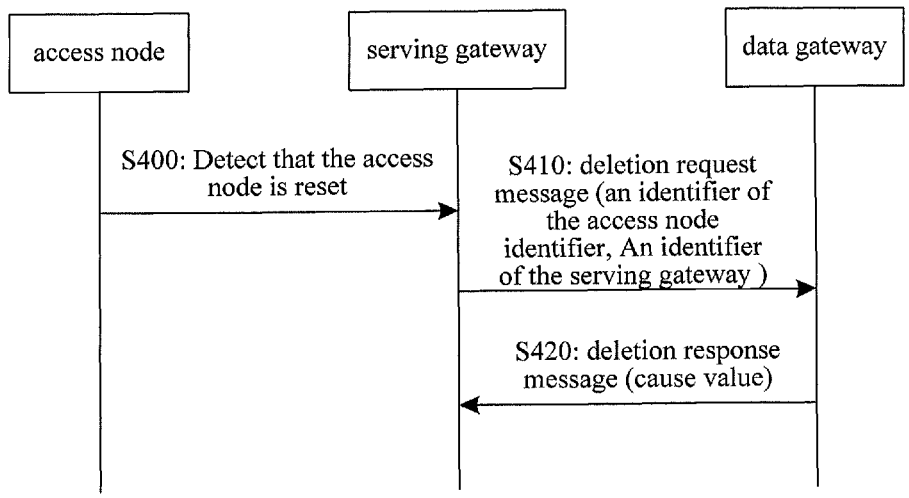
FIG. 4 is a flowchart of a method for handling reset of an access node according to Embodiment 4 of the present invention.

The process of the method of Embodiment 4 is shown in FIG. 4.

S400: The serving gateway detects reset and restart of the access node.

Specifically, if the interface protocol between the access node and the serving gateway is the GTP, the serving gateway may detect reset and restart of the access node through a count value of a restart counter carried in a received GTP message (for example, a path management message or a tunnel management message) and a count value of a restart counter of the access node in the serving gateway. In addition, if the serving gateway detects reset and restart of the access node, the serving gateway should use the restart counter carried in the GTP message to update the locally stored restart counter of the access node.

If the interface protocol between the access node and the serving gateway is the PMIP, the serving gateway may detect reset and restart of the access node through a count value of a restart counter carried in a received heartbeat response message and a count value of a restart counter of the access node in the serving gateway. In addition, if the serving gateway detects reset and restart of the access node, the serving gateway should use the count value of the restart counter carried in the heartbeat response message to update the locally stored restart counter.

S410: The serving gateway sends a deletion request message to the data gateway, where the deletion request message carries an identifier of the access node and an identifier of the serving gateway. The identifier of the access node and the identifier of the serving gateway may both be IP address or non IP address identifiers, and a non IP address identifier can still uniquely identify a node.

In the case that the interface protocol between the serving gateway and the data gateway is the GTP, the deletion request message sent by the serving gateway may be a delete bearer request message, a delete PDN connection set request message or a delete session request message. In the case that the interface protocol between the serving gateway and the data gateway is the PMIP, the deletion request message sent by the serving gateway may be a binding revocation indication message.

S420: After the data gateway receives the deletion request message sent by the serving gateway, the data gateway deletes PDN connection context information or BCE corresponding to the identifier of the access node and the identifier of the serving gateway. For example, the data gateway uses the identifier of the access node and the identifier of the serving gateway carried in the deletion request message to search in PDN connection context information or BCE, so as to obtain PDN connection context information or BCE corresponding to the identifier of the access node and the identifier of the serving gateway carried in the message, and the data gateway deletes the found PDN connection context information or BCE corresponding to the identifier of the access node and the identifier of the serving gateway. For another example, the data gateway directly indexes corresponding PDN connection context information or BCE through the identifier of the access node and the identifier of the serving gateway, and the data gateway deletes the found PDN connection context information or BCE. The data gateway returns a deletion response message to the serving gateway, where the deletion response message carries a cause value, and the cause value carried in the deletion response message may indicate whether the PDN connection context information or BCE associated with the access node and the serving gateway is successfully deleted.

In the case that the interface protocol between the data gateway and the serving gateway is the GTP, corresponding to the deletion request message sent by the serving gateway, the deletion response message sent by the data gateway may be a delete bearer response message, a delete PDN connection set response message or a delete session response message. In the case that the interface protocol between the data gateway and the serving gateway is the PMIP, corresponding to the deletion request message sent by the serving gateway, the deletion response message sent by the data gateway may be a binding revocation acknowledgement message.

In addition, Embodiment 4 is described with an example of deleting PDN connection context information or BCE, and if it needs to set PDN connection context information or BCE be invalid, rather than delete PDN connection context information or BCE, it only needs to replace the deletion operation in this embodiment with an invalidation operation. The invalidation operation is, for example, setting an invalid identifier for PDN connection context information or BCE.

It should be noted that, if in Embodiment 4, the data gateway is connected to the access node through a plurality of serving gateways, for example, the data gateway is connected to the access node through a serving gateway 1, and the data gateway is also connected to the access node through a serving gateway 2, each serving gateway connected to the access node sends a deletion request message to the data gateway after the access node is reset, so that the data gateway may delete all context information stored therein and associated with the access node or set all context information stored therein and associated with the access node be invalid.

Embodiment 5

Method for handling reset of a data gateway. In this embodiment, a data gateway (that is, a first node) may include a PGW, an LMA or an HA, a serving gateway (that is, an intermediate node) may include an SGW, an MAG or an FA, and an access node (that is, a remote node) may include an MME, an SGSN, an A-GW or an ePDG.

Figure 5:
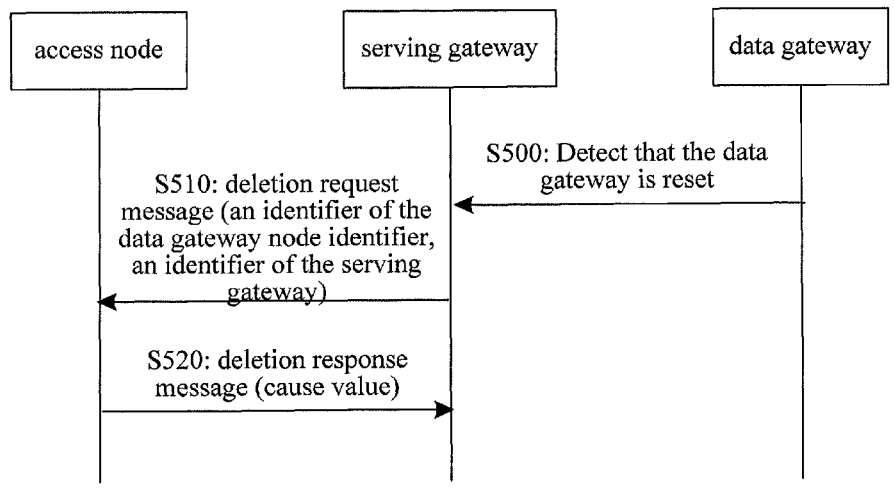
FIG. 5 is a flowchart of a method for handling reset of a data gateway according to Embodiment 5 of the present invention.

The process of the method of Embodiment 5 is shown in FIG. 5.

S500: The serving gateway detects reset and restart of the data gateway.

Specifically, if the interface protocol between the data gateway and the serving gateway is the GTP, the serving gateway may detect reset and restart of the data gateway through the count value of a restart counter carried in a received GTP message (for example, a path management message or a tunnel management message) and the count value of a restart counter of the data gateway in the serving gateway. In addition, if the serving gateway detects reset and restart of the data gateway, the serving gateway should use the count value of the restart counter carried in the GTP message to update the locally stored restart counter of the data gateway.

If the interface protocol between the data gateway and the serving gateway is the PMIP, the serving gateway may detect reset and restart of the data gateway through the count value of a restart counter carried in a received heartbeat response message and the count value of a restart counter of the data gateway in the serving gateway. In addition, if the serving gateway detects reset and restart of the data gateway, the serving gateway should use the count value of the restart counter carried in the heartbeat response message to update the locally stored restart counter of the data gateway.

S510: The serving gateway sends a deletion request message to the access node, where the deletion request message carries an identifier of the date gateway and an identifier of the serving gateway. The identifier of the date gateway and the identifier of the serving gateway may both be IP address or non IP address identifiers, and a non IP address identifier can still uniquely identify a node.

In the case that the interface protocol between the serving gateway and the access node is the GTP, the deletion request message sent by the serving gateway may be a delete bearer request message, a delete PDN connection set request message or a delete session request message. In the case that the interface protocol between the serving gateway and the access node is the PMIP, the deletion request message sent by the serving gateway may be a binding revocation indication message.

S520: After receiving the deletion request message sent by the serving gateway, the access node deletes PDN connection context information, BULE, UE context information or PDP context information corresponding to the identifier of the date gateway and the identifier of the serving gateway. For example, the access node uses the identifier of the date gateway and the identifier of the serving gateway carried in the deletion request message to search in PDN connection context information, BULE, UE context or PDP context information, so as to obtain PDN connection context information, BULE, UE context or PDP context corresponding to the identifier of the date gateway and the identifier of the serving gateway carried in the message, and the access node deletes the found PDN connection context information, BULE, UE context or PDP context information corresponding to the identifier of the date gateway and the identifier of the serving gateway. The access node returns a deletion response message to the serving gateway, where the deletion response message carries a cause value, and the cause value carried in the deletion response message may indicate whether the access node successfully deletes the PDN connection context information, BULE, UE context or PDP context information associated with the data gateway and the serving gateway.

In the case that the interface protocol between the access node and the serving gateway is the GTP, corresponding to the deletion request message sent by the serving gateway, the deletion response message sent by the access node may be a delete bearer response message, a delete PDN connection set response message or a delete session response message. In the case that the interface protocol between the access node and the serving gateway is the PMIP, corresponding to the deletion request message sent by the serving gateway, the deletion response message sent by the access node may be a binding revocation acknowledgement message.

Likewise, Embodiment 5 is described with an example of deleting PDN connection context information, BULE, UE context or PDP context, and if it needs to set PDN connection context information, BULE, UE context or PDP context be invalid, rather than delete PDN connection context information, BULE, UE context or PDP context, it only needs to replace the deletion operation in this embodiment with an invalidation operation. The invalidation operation is, for example, setting an invalid identifier for PDN connection context information, BULE, UE context information or PDP context information.

It should be noted that, if in Embodiment 5, the access node is connected to the data gateway through a plurality of serving gateways, for example, the access node is connected to the data gateway through a serving gateway 1, and the access node is also connected to the data gateway through a serving gateway 2, each serving gateway connected to the data gateway sends a deletion request message to the access node after the data gateway is reset, so that the access node may delete all context information stored therein and associated with the data gateway or set all context information stored therein and associated with the data gateway be invalid.

Embodiment 6

Method for handling a fault of a path between a serving gateway and an access node or unreachability of the access node. In this embodiment, an access node (that is, a first node) may include an MME, an SGSN, an A-GW or an ePDG, a serving gateway (that is, an intermediate node) may include an SGW, an MAG or an FA, and a data gateway (that is, a remote node) may include a PGW, an LMA or an HA.

Figure 6:
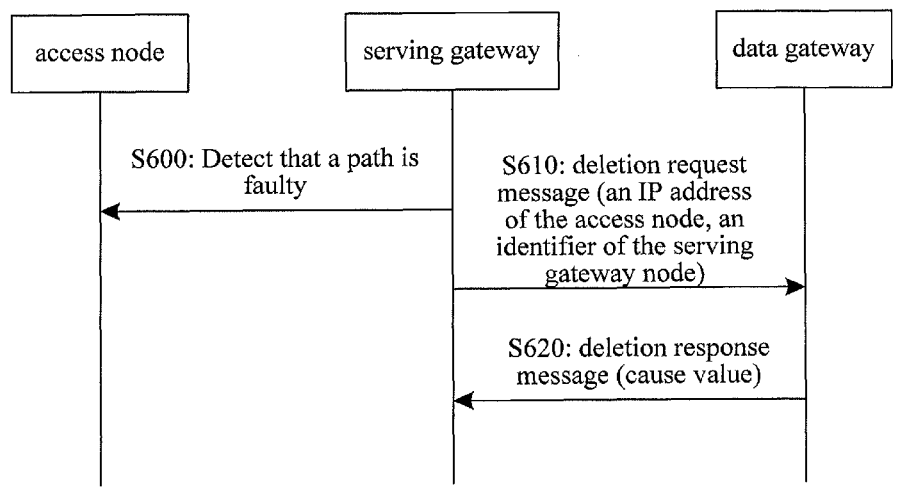
FIG. 6 is a flowchart of a method for handling path fault to an access node or unreachability of the access node according to Embodiment 6 of the present invention.

The process of the method of Embodiment 6 is shown in FIG. 6.

S600: The serving gateway detects that a path between the serving gateway and the access node is faulty or that the access node is unreachable.

Specifically, if the interface protocol between the access node and the serving gateway is the GTP, the serving gateway may send an echo request message, and detect that a path between the serving gateway and the access node is faulty according to a received echo response message. For example, if the serving gateway does not receive an echo response message sent by the access node within the last message retransmission time, the serving gateway detects that the path between the serving gateway and the access node is faulty.

If the interface protocol between the access node and the serving gateway is the PMIP, the serving gateway may send a heartbeat request message, and detect that the access node is unreachable according to a received heartbeat response message. For example, if the number of heartbeat response messages not received by the serving gateway exceeds a preconfigured maximum allowable number of missing heartbeat messages, the serving gateway detects that the access node is unreachable.

S610: The serving gateway sends a deletion request message to the data gateway, where the deletion request message carries an access node IP address and an identifier of the serving gateway. The identifier of the serving gateway may be an IP address or non IP address identifier of the serving gateway, and the non IP address identifier of the serving gateway can still uniquely identify the serving gateway.

In the case that the interface protocol between the serving gateway and the data gateway is the GTP, the deletion request message sent by the serving gateway may be a delete bearer request message, a delete PDN connection set request message or a delete session request message. In the case that the interface protocol between the serving gateway and the data gateway is the PMIP, the deletion request message sent by the serving gateway may be a binding revocation indication message.

It should be noted that, if a Fully qualified PDN Connection Set Identifier (fully qualified PDN connection set identifier, FQ-CSID) assigned by the access node in PDN connection context information, UE context information, BCE or BULE in the serving gateway includes the access node IP address, the serving gateway carries the access node IP address in the deletion request message.

S620: After receiving the deletion request message sent by the serving gateway, the data gateway deletes context information corresponding to the access node IP address and the identifier of the serving gateway, for example, the data gateway uses the access node IP address and the identifier of the serving gateway carried in the deletion request message to search in PDN connection context information or BCE, so as to obtain PDN connection context information or BCE corresponding to the access node IP address and the identifier of the serving gateway carried in the message, and the data gateway deletes the found PDN connection context information or BCE corresponding to the access node IP address and the identifier of the serving gateway. The data gateway returns a deletion response message to the serving gateway, where the deletion response message carries a cause value, and the cause value carried in the deletion response message may indicate whether the data gateway successfully deletes the PDN connection context information or BCE associated with the access node and the serving gateway.

In the case that the interface protocol between the data gateway and the serving gateway is the GTP, corresponding to the deletion request message sent by the serving gateway, the deletion response message sent by the data gateway may be a delete bearer response message, a delete PDN connection set response message or a delete session response message. In the case that the interface protocol between the data gateway and the serving gateway is the PMIP, corresponding to the deletion request message sent by the serving gateway, the deletion response message sent by the data gateway may be a binding revocation acknowledgement message.

In addition, Embodiment 6 is described with an example of deleting PDN connection context information or BCE, and if it needs to set PDN connection context information or BCE be invalid, rather than delete PDN connection context information or BCE, it only needs to replace the deletion operation in this embodiment with an invalidation operation. The invalidation operation is, for example, setting an invalid identifier for PDN connection context information or BCE.

Embodiment 7

Method for handling a fault of a path between a serving gateway and a data gateway or unreachability of the data gateway. In this embodiment, a data gateway (that is, a first node) may include a PGW, an LMA or an HA, a serving gateway (that is, an intermediate node) may include an SGW, an MAG or an FA, and an access node (that is, a remote node) may include an MME, an SGSN, an A-GW or an ePDG.

Figure 7:
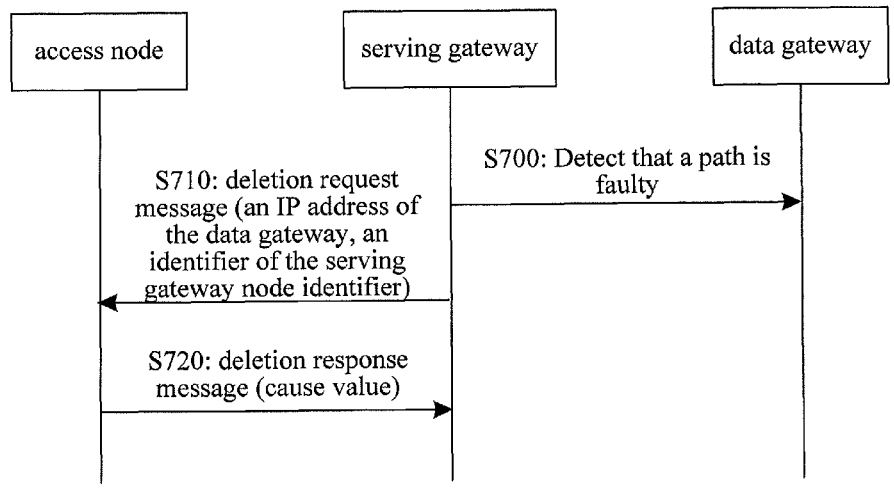
FIG. 7 is a flowchart of a method for handling path fault to a data gateway or unreachability of the data gateway according to Embodiment 7 of the present invention.

The process of the method of Embodiment 7 is shown in FIG. 7.

S700: The serving gateway detects that a path between the serving gateway and the data gateway is faulty or that the data gateway is unreachable.

Specifically, if the interface protocol between the data gateway and the serving gateway is the GTP, the serving gateway may send an echo request message, and detect that a path between the serving gateway and the data gateway is faulty according to a received echo response message. For example, if the serving gateway does not receive an echo response message sent by the data gateway within the last message retransmission time, the serving gateway detects that the path between the serving gateway and the data gateway is faulty.

If the interface protocol between the data gateway and the serving gateway is the PMIP, the serving gateway may send a heartbeat request message, and detect that the data gateway is unreachable according to a received heartbeat response message. For example, if the number of heartbeat response messages not received by the serving gateway exceeds a preconfigured maximum allowable number of missing heartbeat messages, the serving gateway detects that the data gateway is unreachable.

S710: The serving gateway sends a deletion request message to the access node, where the deletion request message carries a data gateway IP address and an identifier of the serving gateway. The identifier of the serving gateway may be an IP address or non IP address identifier of the serving gateway, and the non IP address identifier of the serving gateway can still uniquely identify the serving gateway.

In the case that the interface protocol between the serving gateway and the access node is the GTP, the deletion request message sent by the serving gateway may be a delete bearer request message, a delete PDN connection set request message or a delete session request message. In the case that the interface protocol between the serving gateway and the access node is the PMIP, the deletion request message sent by the serving gateway may be a binding revocation indication message.

S720: After receiving the deletion request message sent by the serving gateway, the access node deletes context information corresponding to the identifier of the serving gateway and the data gateway IP address, for example, the access node uses the data gateway IP address and the identifier of the serving gateway carried in the deletion request message to search in stored PDN connection context information, BULE, PDP context information or UE context information, so as to obtain PDN connection context information, BULE, PDP context information or UE context information corresponding to the data gateway IP address and the identifier of the serving gateway carried in the message, and the access node deletes the found PDN connection context information, BULE, PDP context information or UE context information corresponding to the data gateway IP address and the identifier of the serving gateway. The access node returns a deletion response message to the serving gateway, where the deletion response message carries a cause value, and the cause value carried in the deletion response message may indicate whether the access node successfully deletes the PDN connection context information, BULE, PDP context information or UE context information associated with the data gateway and the serving gateway.

In the case that the interface protocol between the access node and the serving gateway is the GTP, corresponding to the deletion request message sent by the serving gateway, the deletion response message sent by the access node may be a delete bearer response message, a delete PDN connection set response message or a delete session response message. In the case that the interface protocol between the access node and the serving gateway is the PMIP, corresponding to the deletion request message sent by the serving gateway, the deletion response message sent by the access node may be a binding revocation acknowledgement message.

In addition, Embodiment 7 is described with an example of deleting PDN connection context information, BULE, PDP context information or UE context information in the access node, and if it needs to set PDN connection context information, BULE, PDP context information or UE context information in the access node be invalid, rather than delete PDN connection context information, PDP context information, UE context information or BULE, it only needs to replace the deletion operation in this embodiment with an invalidation operation. The invalidation operation is, for example, setting an invalid identifier for PDN connection context information, BULE, PDP context information or UE context information.

Embodiment 8

Method for handling a fault of a path between a serving gateway and an access node or unreachability of the access node. In this embodiment, an access node (that is, a first node) may include an MME, an SGSN, an A-GW or an ePDG, a serving gateway (that is, an intermediate node) may include an SGW, an MAG or an FA, and a data gateway (that is, a remote node) may include a PGW, an LMA or an HA.

Figure 8:
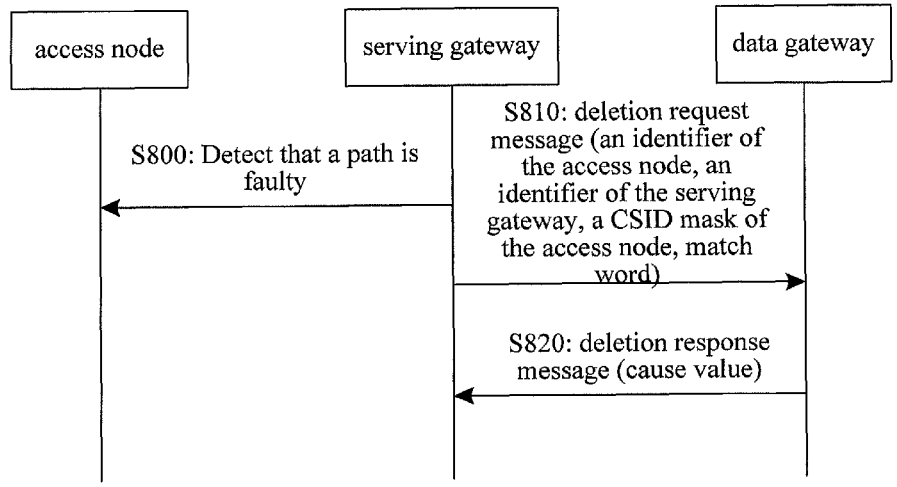
FIG. 8 is a flowchart of a method for handling path failure to an access node or unreachability of the access node according to Embodiment 8 of the present invention.

The process of the method of Embodiment 8 is shown in FIG. 8.

S800: The serving gateway detects that a path between the serving gateway and the access node is faulty or that the access node is unreachable.

Specifically, if the interface protocol between the access node and the serving gateway is the GTP, the serving gateway may send an echo request message, and detect that a path between the serving gateway and the access node is faulty according to a received echo response message. For example, if the serving gateway does not receive an echo response message sent by the access node within the last message retransmission time, the serving gateway detects that the path between the serving gateway and the access node is faulty.

If the interface protocol between the access node and the serving gateway is the PMIP, the serving gateway may send a heartbeat request message, and detect that the access node is unreachable according to a received heartbeat response message. For example, if the number of heartbeat response messages not received by the serving gateway exceeds a preconfigured maximum allowable number of missing heartbeat messages, the serving gateway detects that the access node is unreachable.

S810: The serving gateway obtains a first match word through a CSID of the access node in PDN connection context information, UE context information or BCE corresponding to the access node and a CSID mask of the access node in the serving gateway, for example, the serving gateway obtains the first match word by performing the AND operation of the CSID mask of the access node and the CSID of the access node, and the serving gateway carries an identifier of the access node, an identifier of the serving gateway, the CSID mask of the access node and the first match word in a deletion request message, and sends the deletion request message to the data gateway. The identifier of the access node carried in the deletion request message is a non IP address identifier of the access node. The identifier of the serving gateway carried in the deletion request message may be an IP address or non IP address identifier of the serving gateway, and the non IP address identifier of the serving gateway can still uniquely identify the serving gateway.

In the case that the interface protocol between the serving gateway and the data gateway is the GTP, the deletion request message sent by the serving gateway may be a delete bearer request message, a delete PDN connection set request message or a delete session request message. In the case that the interface protocol between the serving gateway and the data gateway is the PMIP, the deletion request message sent by the serving gateway may be a binding revocation indication message.

S820: After receiving the deletion request message sent by the serving gateway, the data gateway obtains a second match word through a CSID of the access node and the CSID mask of the access node, in which the CSID of the access node is included in PDN connection context information or BCE corresponding to the identifier of the access node and the identifier of the serving gateway carried in the message, and the CSID mask of the access node is carried in the deletion request message, for example, the data gateway obtains the second match word by performing the AND operation of the CSID mask of the access node and the CSID of the access node. The data gateway deletes the PDN connection context information or BCE with the first match word and the second match word being the same.

Then, the data gateway returns a deletion response message to the serving gateway, where the deletion response message carries a cause value, and the cause value carried in the deletion response message may indicate whether the data gateway successfully deletes the PDN connection context information or BCE associated with the access node and the serving gateway.

In the case that the interface protocol between the data gateway and the serving gateway is the GTP, corresponding to the deletion request message sent by the serving gateway, the deletion response message sent by the data gateway may be a delete bearer response message, a delete PDN connection set response message or a delete session response message. In the case that the interface protocol between the data gateway and the serving gateway is the PMIP, corresponding to the deletion request message sent by the serving gateway, the deletion response message sent by the data gateway may be a binding revocation acknowledgement message.

In addition, Embodiment 8 is described with an example of deleting PDN connection context information or BCE in the data gateway, and if it needs to set PDN connection context information or BCE in the data gateway be invalid, rather than delete PDN connection context information or BCE, it only needs to replace the deletion operation in this embodiment with an invalidation operation. The invalidation operation is, for example, setting an invalid identifier for PDN connection context information or BCE.

Embodiment 9

Method for handling a fault of a path between a serving gateway and a data gateway or unreachability of the data gateway. In this embodiment, a data gateway (that is, a first node) may include a PGW, an LMA or an HA, a serving gateway (that is, an intermediate node) may include an SGW, an MAG or an FA, and an access node (that is, a remote node) may include an MME, an SGSN, an A-GW or an ePDG.

Figure 9:
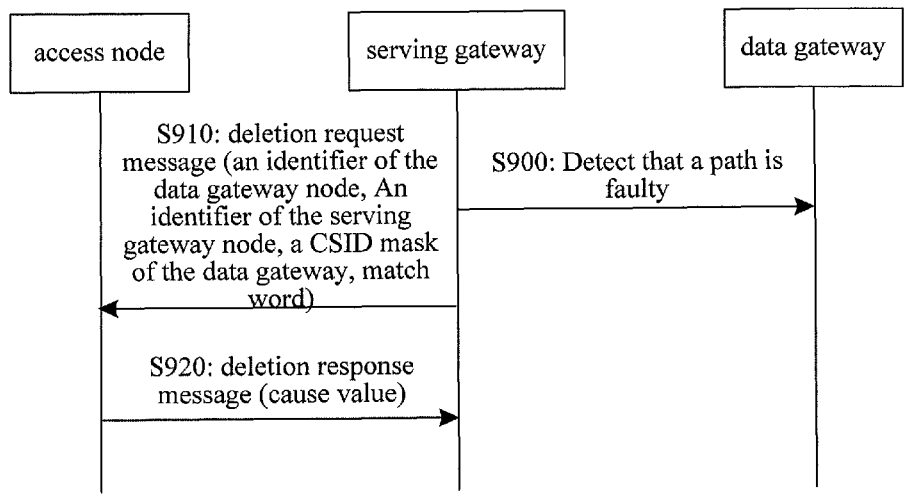
FIG. 9 is a flowchart of a method for handling path fault to a data gateway or unreachability of the data gateway according to Embodiment 9 of the present invention.

The process of the method of Embodiment 9 is shown in FIG. 9.

S900: The serving gateway detects that a path between the serving gateway and the data gateway is faulty or that the data gateway is unreachable.

Specifically, if the interface protocol between the data gateway and the serving gateway is the GTP, the serving gateway may send an echo request message, and detect that a path between the serving gateway and the data gateway is faulty according to a received echo response message. For example, if the serving gateway does not receive an echo response message sent by the data gateway within the last message retransmission time, the serving gateway detects that the path between the serving gateway and the data gateway is faulty.

If the interface protocol between the data gateway and the serving gateway is the PMIP, the serving gateway may send a heartbeat request message, and detect that the data gateway is unreachable according to a received heartbeat response message. For example, if the number of heartbeat response messages not received by the serving gateway exceeds a preconfigured maximum allowable number of missing heartbeat messages, the serving gateway detects that the data gateway is unreachable.

S910: The serving gateway obtains a first match word through a CSID of the data gateway included in PDN connection context information, UE context information, BCE or BULE corresponding to the data gateway and a CSID mask of the data gateway in the serving gateway, for example, the serving gateway obtains the first match word by performing the AND operation of the CSID mask of the data gateway and the CSID of the data gateway, and the serving gateway carries an identifier of the date gateway, an identifier of the serving gateway, the CSID mask of the data gateway and the first match word in a deletion request message, and sends the deletion request message to the access node. The identifier of the date gateway carried in the deletion request message is a non IP address identifier of an access node. The identifier of the serving gateway carried in the deletion request message may be an IP address or non IP address identifier of the serving gateway, and the non IP address identifier of the serving gateway can still uniquely identify the serving gateway.

In the case that the interface protocol between the serving gateway and the access node is the GTP, the deletion request message sent by the serving gateway may be a delete bearer request message, a delete PDN connection set request message or a delete session request message. In the case that the interface protocol between the serving gateway and the access node is the PMIP, the deletion request message sent by the serving gateway may be a binding revocation indication message.

S920: After receiving the deletion request message sent by the serving gateway, the access node obtains a second match word, through a CSID of the data gateway and the CSID mask of the data gateway, which the CSID of the data gateway is included in PDN connection context information, BULE, PDP context information or UE context information corresponding to the identifier of the date gateway and the identifier of the serving gateway carried in the message, and the CSID mask of the data gateway is carried in the deletion request message, for example, the access node obtains the second match word by performing the AND operation of the CSID mask of the data gateway and the CSID of the data gateway. The access node deletes the PDN connection context information, BULE, PDP context information or UE context information with the first match word and the second match word being the same.

Then, the access node returns a deletion response message to the serving gateway, where the deletion response message carries a cause value, and the cause value carried in the deletion response message may indicate whether the access node successfully deletes the PDN connection context information, BULE, PDP context information or UE context information associated with the data gateway and the serving gateway.

In the case that the interface protocol between the access node and the serving gateway is the GTP, corresponding to the deletion request message sent by the serving gateway, the deletion response message sent by the access node may be a delete bearer response message, a delete PDN connection set response message or a delete session response message. In the case that the interface protocol between the access node and the serving gateway is the PMIP, corresponding to the deletion request message sent by the serving gateway, the deletion response message sent by the access node may be a binding revocation acknowledgement message.

In addition, Embodiment 9 is described with an example where the access node deletes PDN connection context information, BULE, PDP context information or UE context information, and if the access node needs to set PDN connection context information, BULE, PDP context information or UE context information be invalid, rather than delete PDN connection context information, BULE, PDP context information or UE context information, it only needs to replace the deletion operation in this embodiment with an invalidation operation. The invalidation operation is, for example, setting an invalid identifier for PDN connection context information, BULE, PDP context information or UE context information.

In the embodiments involving CSID masks described above, the intermediate node needs to store a CSID mask of the first node, the intermediate node may store the CSID mask of the first node in a message sent by the first node in a process of initial communication with the first node, that is, the first node sends the CSID mask of the first node to the intermediate node through a message in a process of initial communication with the intermediate node. Specific examples of the process of storing the CSID mask of the first node by the intermediate node may be as described in the following embodiments.

Embodiment 10

Method for storing a CSID mask of the access node by a serving gateway. The method is shown in FIG. 10.

Figure 10:
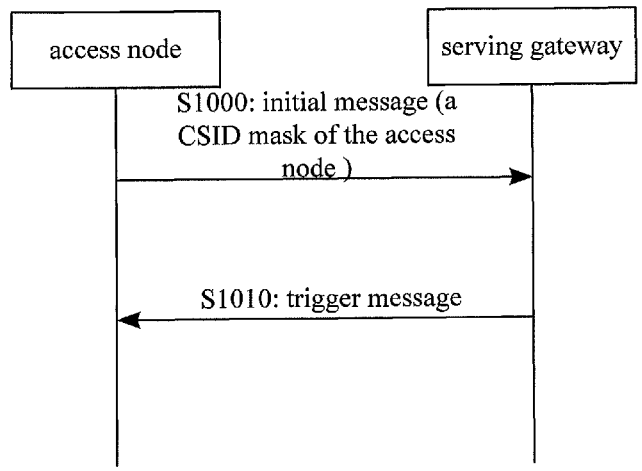
FIG. 10 is a schematic flowchart of obtaining a CSID according to Embodiment 10 of the present invention.

In FIG. 10, S1000: When an access node communicates with a serving gateway for the first time, the access node carries a CSID mask of the access node in an initial message, and sends the initial message to the serving gateway.

S1010: The serving gateway receives the initial message, stores the CSID mask of the access node carried in the initial message, and sends a trigger message to the access node.

Embodiment 11

Method for storing a CSID mask of the access node by a serving gateway. The process of the method is shown in FIG. 11.

Figure 11:
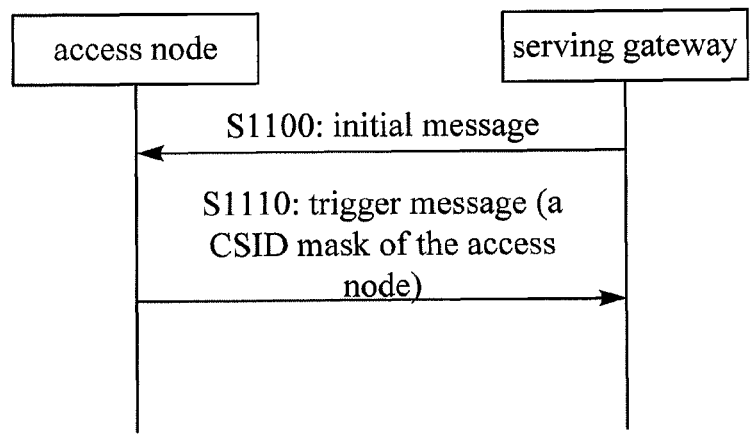
FIG. 11 is a schematic flowchart of obtaining a CSID according to Embodiment 11 of the present invention.

In FIG. 11, S1100: A serving gateway sends an initial message to an access node.

S1110: If the access node communicates with the serving gateway for the first time, the access node carries a CSID mask of the access node in a trigger message, and sends the trigger message to the serving gateway. The serving gateway receives the trigger message, and the serving gateway stores the CSID mask of the access node carried in the trigger message.

In Embodiments 10 and 11, if the interface protocol between the access node and the serving gateway is the GTP, the initial message may include an echo request message, a Create Bearer Request (create bearer request), a Create Session Request (create session request) message, or a Command (command) type message. Correspondingly, the trigger message may include an echo response message, a Create Bearer Response (create bearer response) or a Create Session Response (create session response) message. If the interface protocol between the access node and the serving gateway is the PMIP, the initial message may include a Proxy Binding Update (proxy binding update, PBU) message or a heartbeat request message. Correspondingly, the trigger message may include a Proxy Binding Acknowledgement (proxy binding acknowledgement, PBA) or a heartbeat response message.

Embodiment 12

Method for storing a CSID mask of the data gateway by a serving gateway. The process of the method is shown in FIG. 12.

Figure 12:
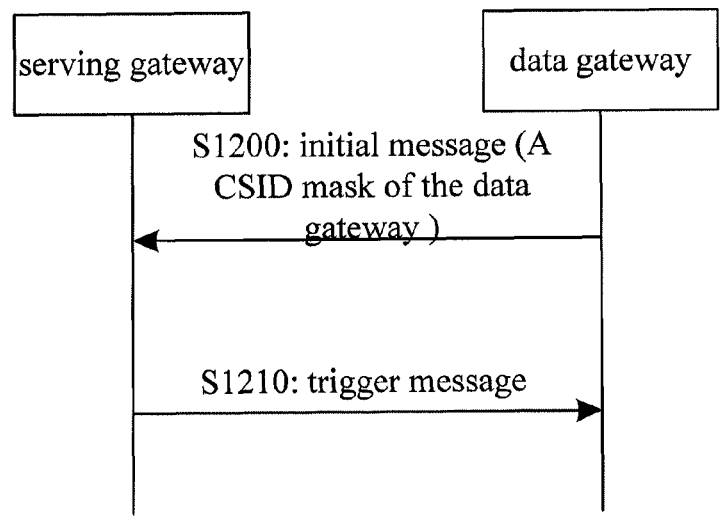
FIG. 12 is a schematic flowchart of obtaining a CSID according to Embodiment 12 of the present invention.

In FIG. 12, S1200: When a data gateway communicates with a serving gateway for the first time, the data gateway carries a CSID mask of the data gateway in an initial message, and sends the initial message to the serving gateway.

S1210: The serving gateway receives the initial message, stores the CSID mask of the data gateway carried in the initial message, and sends a trigger message to the data gateway.

Embodiment 13

Method for storing a CSID mask of the data gateway by a serving gateway. The method is shown in FIG. 13.

Figure 13:
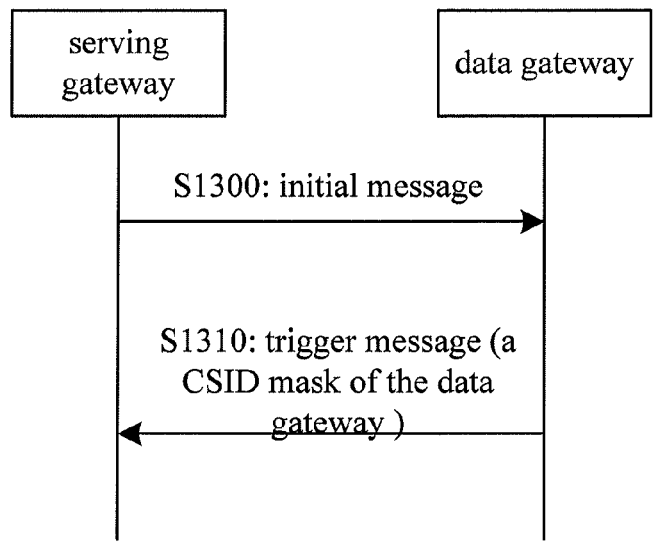
FIG. 13 is a schematic flowchart of obtaining a CSID according to Embodiment 13 of the present invention.

In FIG. 13, S1300: A serving gateway sends an initial message to a data gateway.

S1310: If the data gateway communicates with the serving gateway for the first time, the data gateway carries a CSID mask of the data gateway in a trigger message, and sends the trigger message to the serving gateway. The serving gateway receives the trigger message, and the serving gateway stores the CSID mask of the data gateway carried in the trigger message.

In Embodiments 12 and 13, if the interface protocol between the data gateway and the serving gateway is the GTP, the initial message may include an echo request message, a Create Bearer Request (create bearer request), a Create Session Request (create session request) message, or a Command (command) type message. Correspondingly, the trigger message may include an echo response message, a Create Bearer Response (create bearer response) message or a Create Session Response (create session response). If the interface protocol between the data gateway and the serving gateway is the PMIP, the initial message may include a Proxy Binding Update (proxy binding update, PBU) message or a heartbeat request message. Correspondingly, the trigger message may include a Proxy Binding Acknowledgement (proxy binding acknowledgement, PBA) or a heartbeat response message.

Embodiment 14

Apparatus for handling node failure. The apparatus may be an intermediate node, and the intermediate node may be a network element in a next generation mobile communication network, or a network element in an IP network. The intermediate node may include a serving gateway, a mobile access gateway or an FA. The intermediate node is respectively connected to a first node and a remote node, that is, the first node and the remote node performs information interaction through the intermediate node. In the case that the first node includes a mobility management entity, a GPRS service support node, an A-GW or an evolved packet data gateway, the remote node may include a packet data network gateway, a local mobility anchor or an HA; in the case that the first node includes a packet data network gateway, a local mobility anchor or an HA, the remote node may include a mobility management entity, a GPRS service support node, an A-GW or an evolved packet data gateway. The structure of the apparatus in this embodiment is shown in FIG. 14.

Figure 14:
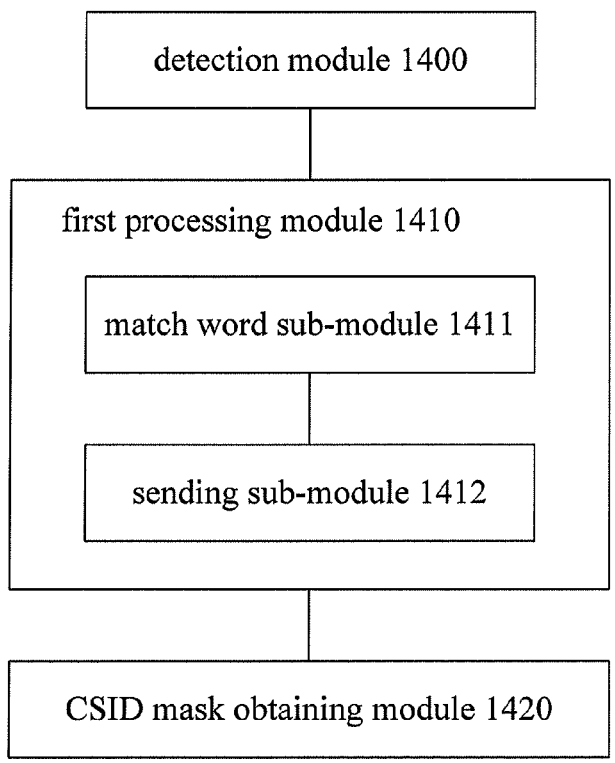
FIG. 14 is a schematic diagram of an apparatus for handling node failure according to Embodiment 14 of the present invention.

The apparatus for handling node failure shown in FIG. 14 includes a detection module 1400 and a first processing module 1410. Optionally, the apparatus may further include a CSID mask obtaining module 1420.

The detection module 1400 is configured to detect that the first node occurs a failure. Here, the failure of the first node represents that access to the first node is abnormal, and the failure of the first node may be caused by an anomaly of the first node, or an abnormal connection between the intermediate node and the first node. Here, the failure of the first node may include the following: the first node is reset, a path between the intermediate node and the first node is faulty, or the first node is unreachable. In an actual network, the failure of the first node may also include other cases except the above three cases, and this embodiment does not limit the specific case included by the failure of the first node.

The detection module 1400 may detect that the first node occurs a failure by adopting existing modes, and the mode of detecting by the detection module 1400 that the first node occurs a failure varies with different networks, for example, the failure of the first node is detected through restart counters, echo messages or heartbeat messages described in the above embodiments. This embodiment does not limit the specific implementation process of detecting by the detection module 1400 that the first node occurs a failure.

The first processing module 1410 is configured to send a context processing request message to the remote node, where the context processing request message is used to instruct the remote node to delete context information associated with the first node and the intermediate node or set the context information associated with the first node and the intermediate node be invalid. The context processing request message sent by the first processing module 1410 to the remote node carries deletion/invalidation location information, and the deletion/invalidation location information is used by the remote node to delete context information corresponding to the deletion/invalidation location information or set the context information corresponding to the deletion/invalidation location information.

The deletion/invalidation location information may include an identifier of the first node and an identifier of the intermediate node. That is, the first processing module 1410 carries an identifier of the first node and an identifier of the intermediate node in the context processing request message, and sends the context processing request message to the remote node, and after receiving the context processing request message, the remote node deletes context information corresponding to the identifier of the first node and the identifier of the intermediate node, or sets the context information corresponding to the identifier of the first node and the identifier of the intermediate node be invalid, for example, the remote node searches stored context information for context information matching the identifier of the first node and the identifier of the intermediate node carried in the message, and deletes the found matching context information or sets the found matching context information be invalid. Here, the identifier of the first node and the identifier of the intermediate node may be IP address identifiers, or non IP address identifiers.

The deletion/invalidation location information may also include an identifier of the first node, an identifier of the intermediate node, a CSID mask of the first node and a first match word. At this time, the first processing module 1410 may include a match word sub-module 1411 and a sending sub-module 1412.

The match word sub-module 1411 is configured to obtain a first match word according to a first node packet data network connection set identifier CSID mask and a CSID of the first node in the context information associated with the first node, where the first match word is used to be compared with a match word obtained by the remote node according to the CSID mask of the first node in the context processing request message and a CSID of the first node in context information, in which the context information is stored in the remote node and corresponds to the identifier of the first node information and the identifier of the intermediate node information, so that the remote node determines that context information with the comparison result being that the match words are the same needs to be deleted or set be invalid. That is, the match word sub-module 1411 obtains the first match word according to the CSID mask of the first node and the CSID of the first node in the context information, for example, obtains the first match word through calculation according to the CSID mask of the first node and the CSID of the first node, and then, the match word sub-module 1411 carries the identifier of the first node, the identifier of the intermediate node, the CSID mask of the first node and the first match word in the context processing request message, and sends the context processing request message to the remote node. After receiving the context processing request message, the remote node obtains a second match word through a CSID mask of the first node carried in the message and a CSID of the first node in context information, in which the context information corresponds to the identifier of the first node and the identifier of the intermediate node carried in the message, and the remote node deletes the context information with the first match word and the second match word being the same or sets the context information with the first match word and the second match word being the same be invalid. It should be noted that, the way for the match word sub-module 1411 to obtain the first match word should be the same as the way for the remote node to obtain the second match word. In addition, the CSID mask of the first node in the intermediate node may be a CSID mask of the first node obtained by the CSID mask obtaining module 1420.

The sending sub-module 1412 is configured to carry the identifier of the first node, the identifier of the intermediate node, the CSID mask of the first node and the first match word obtained by the match word sub-module 1411 in the context processing request message, and send the context processing request message to the remote node.

It should be noted that, the first processing module 1410 may also delete the context information associated with the first node in the intermediate node or set the context information associated with the first node in the intermediate node be invalid. For example, the first processing module 1410 uses the identifier of the first node to search in stored context information, and deletes the found context information. The first processing module 1410 may perform the above deletion or invalidation operation after sending the context processing request message to the remote node, or perform the above deletion or invalidation operation after the intermediate node receives a context processing response message of the remote node.

The CSID mask obtaining module 1420 is configured to store the CSID mask of the first node carried in a message sent by the first node in a process of initial communication between the intermediate node and the first node. For example, the CSID mask obtaining module 1420 stores the CSID mask of the first node carried in an initial message or a trigger message received by the apparatus. The details are as described above in Embodiments 10 to 13, and will not be described herein again.

In Embodiment 14, when the detection module 1400 detects that the first node occurs a failure, the first processing module 1410 s ends the context processing request message to the remote node, so that the remote node may delete the context information associated with the first node and the intermediate node or set the context information associated with the first node and the intermediate node be invalid, so as to prevent the case that, if the first node occurs a failure, the remote node still uses the stored context information associated with the first node and the intermediate node as valid context information, and further prevent the case that the remote node maintains a large amount of context information associated with the first node and the intermediate node, thereby eliminating the potential risk to the network caused by inconsistency of context information in the remote node and the intermediate node and first node, and improving the stability of the network.

Embodiment 15

Apparatus for handling node failure. The apparatus may be a remote node, and the remote node may be a network element in a next generation mobile communication network, or a network element in an IP network. In the case that the first node includes a mobility management entity, a GPRS service support node, an A-GW or an evolved packet data gateway, the remote node may include a packet data network gateway, a local mobility anchor or an HA; in the case that the first node includes a packet data network gateway, a local mobility anchor or an HA, the remote node may include a mobility management entity, a GPRS service support node, an A-GW or an evolved packet data gateway.

Figure 15:
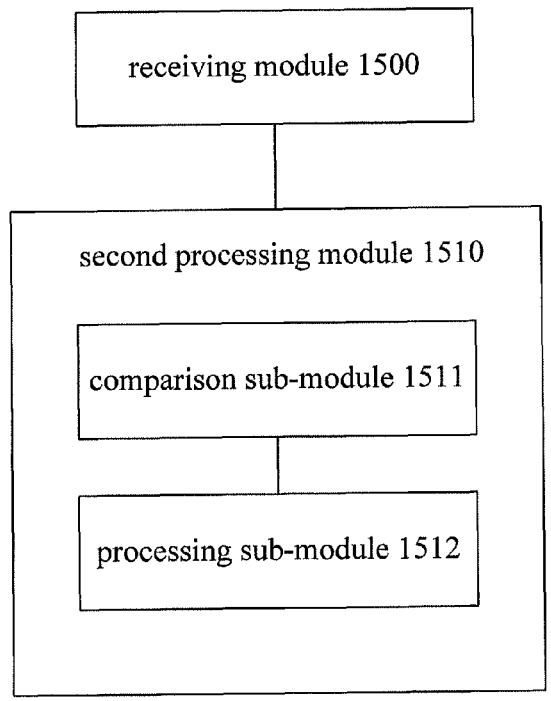
FIG. 15 is a schematic diagram of an apparatus for handling node failure according to Embodiment 15 of the present invention.

The apparatus for handling node failure shown in FIG. 15 includes a receiving module 1500 and a second processing module 1510.

The receiving module 1500 is configured to receive a context processing request message sent by an intermediate node, where the context processing request message is a message sent by the intermediate node when the intermediate node detects that a first node occurs a failure, where the failure of the first node includes the following: the first node is reset, a path between the intermediate node and the first node is faulty, or the first node is unreachable.

The context processing request message received by the receiving module 1500 carries deletion/invalidation location information, and the second processing module 1510 in the remote node may delete corresponding context information or set the corresponding context information be invalid, according to the deletion/invalidation location information carried in the message. The deletion/invalidation location information may include an identifier of the first node and an identifier of the intermediate node.

The second processing module 1510 is configured to delete context information associated with the first node and the second node in the remote node or set the context information associated with the first node and the second node in the remote node be invalid, according to the identifier of the first node and the identifier of the intermediate node carried in the context processing request message received by the receiving module 1500. The context information in the remote node may be embodied in different forms, and the details are as described in the above embodiments, and will not be described herein again. In addition, the second processing module 1510 may further return a context processing response message to the intermediate node, so as to notify the intermediate node whether the context information associated with the first node and the intermediate node is successfully deleted or set be invalid.

In the case that the deletion/invalidation location information includes an identifier of the first node, an identifier of the intermediate node, a CSID mask of the first node and a first match word, the second processing module 1510 may include a comparison sub-module 1511 and a processing sub-module 1512.

The comparison sub-module 1511 is configured to perform match word comparison, where the match word comparison includes: obtaining a second match word according to a CSID of the first node in context information that is stored in the remote node and corresponds to the identifier of the first node and the identifier of the intermediate node, and the CSID mask of the first node in the message, and comparing the obtained second match word with the first match word in the message.

The processing sub-module 1512 is configured to delete the context information with the first match word and the second match word being the same or set the context information with the first match word and the second match word being the same be invalid.

For example, the comparison sub-module 1511 searches the context information stored by the remote node for the context information corresponding to the identifier of the first node and the identifier of the intermediate node carried in the context processing request message, and obtains a second match word through calculation according to a CSID of the first node in the found context information and the CSID mask of the first node carried in the context processing request message; the comparison sub-module 1511 compares the second match word obtained through calculation with the first match word carried in the context processing request message, and if the first match word and the second match word are the same, the processing sub-module 1512 deletes the context information found by the comparison sub-module 1511 or sets the context information found by the comparison sub-module 1511 be invalid; otherwise, the processing sub-module 1512 does not delete the context information found by the comparison sub-module 1511 or set the context information found by the comparison sub-module 1511 be invalid. It should be noted that, the comparison sub-module 1511 finds a plurality of pieces of context information, the comparison sub-module 1511 and the processing sub-module 1512 should perform, for each piece of context information, the process of obtaining the match word and performing a corresponding operation according to the comparison result.

In Embodiment 15, after the receiving module 1500 receives the context processing request message sent by the intermediate node when detecting that the first node occurs a failure, the second processing module 1510 may delete the context information associated with the first node or set the context information associated with the first node be invalid, so as to prevent the case that, if the first node occurs a failure, the remote node still uses the stored context information associated with the first node and the intermediate node as valid context information, and further prevent the case that the remote node maintains a large amount of context information associated with the first node and the intermediate node, thereby eliminating the potential risk to the network caused by inconsistency of context information in the remote node, the first node, and intermediate node, and improving the stability of the network.

Embodiment 16

System for handling node failure. The structure of the system is shown in FIG. 16.

Figure 16:
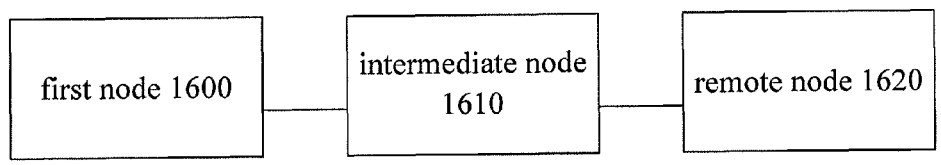
FIG. 16 is a schematic diagram of a system for handling node failure according to Embodiment 16 of the present invention.

The system in FIG. 16 includes a first node 1600, an intermediate node 1610 and a remote node 1620. It should be noted that, although FIG. 16 shows that the numbers of the first node 1600 and the remote node 1620 connected to the first node 1610 are both 1, yet in an actual network, a plurality of first nodes 1600 may be connected to the intermediate node 1610, and a plurality of remote nodes 1620 may be connected to the intermediate node 1610.

The first node 1600 is connected to the remote node 1620 through the intermediate node 1610. The first node 1600 may send a message carrying a CSID mask of the first node to the intermediate node 1610. The message may be an initial message or a trigger message.

The intermediate node 1610 is configured to detect that the first node occurs a failure, and send a context processing request message carrying an identifier of the first node and an identifier of the intermediate node to the remote node 1620, where the failure of the first node includes the following: the first node is reset, a path between the intermediate node and the first node is faulty, or the first node is unreachable; and the context processing request message is used for requesting the remote node to delete context information associated with the first node and the second node or set the context information associated with the first node and the second node be invalid. The context processing request message sent by the intermediate node 1610 to the remote node 1620 may further carry a CSID mask of the first node and a first match word. The intermediate node 1610 may store the CSID mask of the first node carried in a message (for example, an initial message or a trigger message) transmitted from the first node 1600 in a process of initial communication with the first node 1600.

The intermediate node 1610 may further delete context information or set the context information be invalid which the context information is in the intermediate node 1610 and associated with the first node 1600 when detecting that the first node 1600 occurs a failure. The intermediate node 1610 may delete the context information or set the context information be invalid wherein the context information is in the intermediate node 1610 and associated with the first node 1600 after sending the context processing request message to the remote node 1620. The intermediate node 1610 may also delete the context information or set the context information be invalid wherein the context information is in the intermediate node 1610 and associated with the first node 1600 after receiving a context processing response message sent by the remote node 1620. The context information in the intermediate node 1610 may be embodied in different forms, and the details are as described in the above embodiments, and will not be described herein again.

The remote node 1620 is configured to receive the context processing request message sent by the intermediate node 1610, and delete context information associated with the first node and the intermediate node or set the context information associated with the first node and the intermediate node be invalid, according to the identifier of the first node and the identifier of the intermediate node carried in the message. Optionally, after performing the deletion or invalidation operation, the remote node 1620 may send a context processing response message to the intermediate node 1610, so as to notify the intermediate node 1610 whether the context information associated with the first node and the intermediate node is successfully deleted or set be invalid. The context information in the remote node 1620 may be embodied in different forms, and the details are as described in the above embodiments, and will not be described herein again.

In a specific example, the remote node 1620 may search for corresponding context information according to an identifier of the first node and an identifier of the intermediate node carried in the context processing request message, and directly delete the found context information or set the found context information be invalid. In the case that the context processing request message received by the remote node 1620 carries the CSID mask of the first node and the first match word, the remote node 1620 obtains a second match word according to a CSID of the first node in context information in the remote node 1620 and the CSID mask of the first node in the message, in which the context information corresponds to the identifier of the first node and the identifier of the intermediate node, and deletes the context information with the match words being the same or sets the context information with the match words being the same be invalid.

It should be noted that, if a plurality of pieces of context information is associated with the identifier of the first node and the identifier of the intermediate node, the remote node 1620 performs, for each piece of context information, the above process of obtaining the second match word and deleting the context information with the match words being the same or setting the context information with the match words being the same be valid.

The structures of the intermediate node 1610 and the remote node 1620 may be as described above in Embodiments 14 and 15, and the details will not be described herein again.

In Embodiment 16, the intermediate node 1610 sends the context processing request message to the remote node 1620 when detecting that the first node 1600 occurs a failure, so that the remote node 1620 may delete the context information associated with the first node 1600 and the intermediate node 1610 or set the context information associated with the first node 1600 and the intermediate node 1610 be invalid, so as to prevent the case that, if the first node 1600 occurs a failure, the remote node 1620 still uses the stored context information associated with the first node 1600 and the intermediate node 1610 as valid context information, and further prevent the case that the remote node 1620 maintains a large amount of context information associated with the first node 1600 and the intermediate node 1610, thereby eliminating the potential risk to the network caused by inconsistency of context information in the remote node 1620 and the first node 1600 and intermediate node 1610, and improving the stability of the network.

Through the above description of the embodiments, it is clear to persons skilled in the art that the present invention may be accomplished through software plus a necessary hardware platform, or definitely may also be accomplished through hardware only, but in most cases, the present invention is preferably implemented through the former method. Based on this, all or part of the technical solutions of the present invention that make contributions to the prior art may be embodied in the form of a software product. The software product may be configured to execute the processes of the methods described above. The computer software product may be stored in a storage medium, for example, a ROM/RAM, a magnetic disk or an optical disk, and contain several instructions to instruct a computer device (for example, a personal computer, a server, or a network device) to perform the method described in the embodiments of the present invention or in some parts of the embodiments.

Although the present invention has been described through embodiments, it is known to persons skilled in the art that various modifications and variations can be made without departing from the spirit of the present invention, and it is intended that the appended claims of the present invention cover such modifications and variations.

The invention claimed is:

1. A communication system for handling node failure, comprising:
   a serving gateway (SGW) that detects a mobility management entity (MME) failure, obtains a first match word according to a packet data network connection set identifier (CSID) of the MME stored on the SGW and a CSID mask of the MME, and sends a context processing request that comprises an identifier of the SGW, an identifier of the MME, and the CSID mask of the MME and the first match word; and
   a packet data network gateway (PGW) that receives the context processing request, identifies context information stored on the PGW by the identifier of the MME and the identifier of the SGW carried in the context processing request, obtains a second match word according to the CSID mask of the MME carried in the context processing request and a CSID of the MME in the context information stored on the PGW, wherein upon the PGW detects the first match word is the same as the second match word, the PGW deletes the context information stored on the PGW.

2. The system according to claim 1, wherein
   the SGW obtains the CSID mask of the MME from a message sent by the MME in a process of initial communication between the SGW and the MME, and stores the CSID mask of the MME on the SGW.

3. The system according to claim 1, wherein the failure comprises a reset of the MME, a faultiness of a path between the SGW and the MME, or unreachability of the MME.

4. The system according to claim 1, wherein the context processing request message includes: a delete bearer request message, a delete packet data network connection set request message or a delete session request message.

5. The system according to claim 1, wherein
   the SGW deletes context information stored on the SGW, wherein the context information stored on the SGW is associated with the MME.

6. The system according to claim 1, wherein
   the PGW sends a context processing response message to the SGW, wherein the context processing response message is used to notify the SGW whether the PGW successfully deletes the context information stored on the PGW.

7. A method for handling node failure in a communication system comprising a serving gateway (SGW), a packet data network gateway (PGW) and a mobility management entity (MME), comprising:
   detecting, by the SGW, that the MME has a failure;
   obtaining, by the SGW, a first match word according to a packet data network connection set identifier (CSID) of the MME stored on the SGW and a CSID mask of the MME;
   sending, by the SGW, a context processing request to the PGW, wherein the context processing request comprises an identifier of the SGW, an identifier of the MME, the CSID mask of the MME and the first match word;
   identifying, by the PGW, context information stored on the PGW by the identifier of the MME and the identifier of the SGW carried in the context processing request;
   obtaining, by the PGW, a second match word according to the CSID mask of the MME carried in the context processing request and a CSID of the MME in the context information stored on the PGW;
   deleting, by the PGW, the context information stored on the PGW when the first match word is the same as the second match word.

8. The method according to claim 7, further comprising:
   obtaining, by the SGW, the CSID mask of the MME from a message sent by the MME in a process of initial communication between the SGW and the MME;
   storing, by the SGW, the CSID mask of the MME on the SGW.

9. The method according to claim 7, wherein the failure comprises a reset of the MME, a faultiness of a path between the SGW and the MME, or unreachability of the MME.

10. The method according to claim 7, wherein the context processing request message includes: a delete bearer request message, a delete packet data network connection set request message or a delete session request message.

11. The method according to claim 7, further comprising:
    deleting, by the SGW, context information stored on the SGW, wherein the context information stored on the SGW is associated with the MME.

12. The method according to claim 7, further comprising:
    sending, by the PGW, a context processing response message to the SGW, wherein the context processing response message is used to notify the SGW whether the PGW successfully deletes the context information stored on the PGW.

\* \* \* \* \*